United States Patent
Wee et al.

(10) Patent No.: US 7,802,002 B2
(45) Date of Patent: Sep. 21, 2010

(54) MEDIA DATA STREAMING CONSIDERING PERFORMANCE CHARACTERISTICS OF THE STREAMING PATH

(75) Inventors: Susie J. Wee, Palo Alto, CA (US); John G. Apostolopoulos, San Carlos, CA (US); Wai-tian Tan, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2490 days.

(21) Appl. No.: 10/226,497

(22) Filed: Aug. 23, 2002

(65) Prior Publication Data
US 2004/0039836 A1    Feb. 26, 2004

(51) Int. Cl.
G06F 15/16    (2006.01)

(52) U.S. Cl. .................. 709/231; 709/232; 370/412

(58) Field of Classification Search .......... 709/231, 709/232, 233; 370/412, 468
See application file for complete search history.

(56) References Cited

U.S. PATENT DOCUMENTS

| 6,112,226 | A  | * | 8/2000  | Weaver et al. ........... 709/203 |
| 6,990,071 | B2 | * | 1/2006  | Adam et al. ............. 370/230 |
| 2002/0007494 | A1 | * | 1/2002 | Hodge .................. 725/109 |
| 2003/0193893 | A1 | * | 10/2003 | Wen et al. ............. 370/231 |
| 2006/0239286 | A1 | * | 10/2006 | Schneider ............. 370/412 |

* cited by examiner

Primary Examiner—Ario Etienne
Assistant Examiner—El Hadji M Sall

(57) ABSTRACT

A method and system thereof for streaming media data are described. Media data comprising blocks of data are streamed in an order that is selected according to the performance characteristics of the network path used for the streaming.

40 Claims, 11 Drawing Sheets

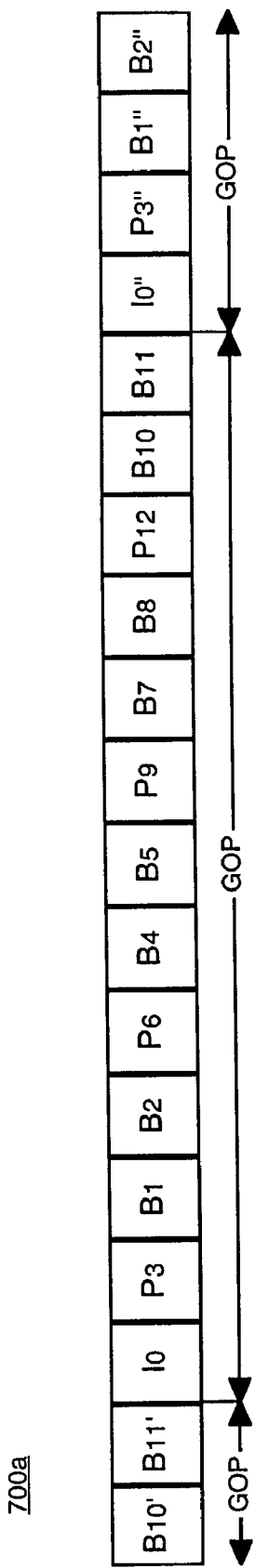

MEDIA DATA STREAMING CONSIDERING PERFORMANCE CHARACTERISTICS OF THE STREAMING PATH

TECHNICAL FIELD

Embodiments of the present invention relate to the field of streaming media data. More specifically, embodiments of the present invention relate to the order in which the media data are streamed.

BACKGROUND ART

Streaming media systems transmit media data, such as video and audio data, over wired and/or wireless networks. Data transmitted over such networks can experience delays along the way, perhaps arriving late at a destination node. In some instances, data may be lost and retransmitted.

The effects of late or lost data may be exacerbated for video data that are predictively encoded (compressed). Video frames are preferably received before their display (playback) times. With predictive encoding, the decoding of a frame of data may rely on the information in another frame, and therefore some frames need to be received earlier than their display time so that they can be used to decode other frames. For example, with MPEG (Moving Pictures Experts Group) encoding, a P-frame is predicted from a preceding P-frame or I-frame, and a B-frame is predicted from two preceding P-frames or a preceding I-frame and P-frame (for streams stored in their encoded order).

Different types of frames have different transmission time requirements; for example, an I-frame may be larger and therefore may take longer to transmit than a P-frame or B-frame. Also, frames may encounter different length delays as they travel through the network, depending on the path they travel. Different paths may have different propagation delays, and nodes (e.g., intermediate servers or routers) along one path may introduce different queuing delays than the nodes along another path. Even frames traveling through the same node may experience different queuing delays, because the length of the queue at a node can grow or shrink with time. In general, the variation in delay experienced by individual frames can be quite large over a network.

Predictive encoding introduces dependencies in the encoded data that improve the amount of compression but can also result in error propagation in the event of data loss or late arrival. In networks with significant delay variations, some encoded video frames may arrive late at the decoder (e.g., a client or destination node). These frames may not only miss their respective display deadlines, but they may also prevent a number of other, subsequent frames from being displayed properly.

If, for example, an I-frame or P-frame arrives late or is lost, then it might not be possible to decode and display a subsequent P-frame or B-frame. In the case in which a P-frame cannot be decoded because a preceding I-frame or P-frame is absent, other subsequent frames dependent on that P-frame may not be decoded. Thus, a number of frames may be prevented from being properly decoded and displayed due to a single late or missing frame, depending on the particular coding dependencies of the late or missing frame. This can affect the overall quality of the display.

In summary, popular and effective encoding techniques such as MPEG encoding rely on the relationships between frames for decoding. Thus, if a frame is late, the decoding of other frames may be affected, possibly affecting the quality of the video display. Techniques such as MPEG encoding are useful in some applications. However, because of the dependency between frames, the application of MPEG encoding in streaming networks, the Internet, content delivery networks, etc.—especially networks that may experience significant delay variations—can be problematic.

DISCLOSURE OF THE INVENTION

Embodiments of the present invention pertain to a method and system thereof for streaming media data. Media data comprising blocks of data are streamed in an order that is selected according to the performance characteristics of the network path used for the streaming.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7A illustrates frames of data in an initial order according to one embodiment of the present invention.

FIGS. 7B, 7C and 7D illustrate frames of data after they have been reordered according to different network performance characteristics in accordance with one embodiment of the present invention.

Figure 1:
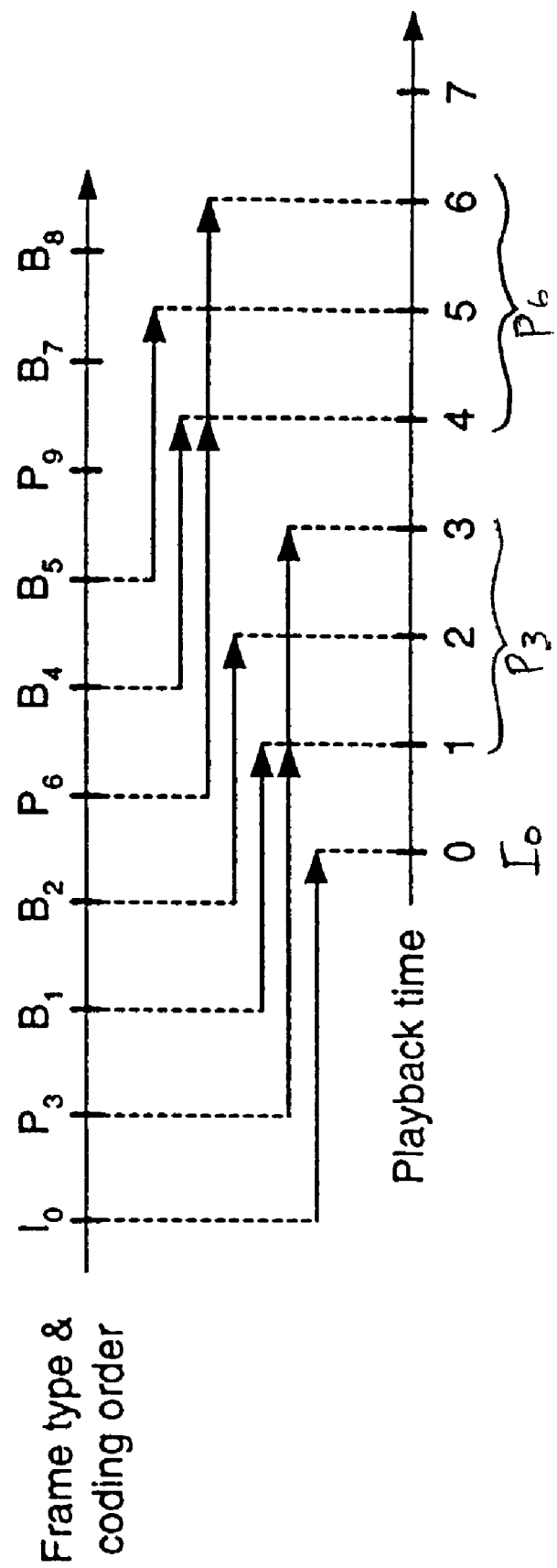
FIG. 1 is an illustration of the transmission conditions associated with encoded video data according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are discussed in the context of multimedia data (also referred to herein as media data or media content). One example of multimedia data is video data accompanied by audio data; for example, a movie with soundtrack. However, media data can be video only, audio only, or both video and audio. In general, the present invention, in its various embodiments, is well-suited for use with audio-based data, image-based data, Web page-based data, graphic data and the like, and combinations thereof. Also, the present invention, in its various embodiments, is well-suited for use with data that may or may not be encoded (compressed), encrypted or transcoded.

In particular, embodiments of the present invention are described for video data, and in particular video data that are encoded using a predictive encoding technique such as MPEG encoding. Because of the prediction and temporal dependencies introduced by such encoding techniques, predictively encoded video data introduce additional challenges relative to other types of data. As will be seen, the various features of the present invention can be applied to other types of data, particularly media data not as challenging as predictively encoded video data.

The media (e.g., video) data are typically separated into blocks of data. In overview, embodiments of the present invention provide a method and system in which the order in which blocks (e.g., frames) of media data are streamed is selected based on the performance characteristics of the network (e.g., a streaming network, the Internet, a content delivery network, etc.). Performance characteristics generally refer to the delays experienced as the media data are passed through nodes and over the links between nodes in the network. In its various embodiments, the present invention introduces an improved streaming strategy that involves the reordering of the media data relative to an initial (intended) order of streaming, so that more important and delay-sensitive data are transmitted earlier than they would have been otherwise. The initial order of streaming may correspond to the order in which the data were encoded. By streaming the media data in a different order, the on-time delivery of more important data can be improved.

FIG. 1 is an illustration of the transmission conditions associated with MPEG-encoded video data according to one embodiment of the present invention. Video encoders such as MPEG encoders encode blocks of data as I-frames, P-frames or B-frames, which have different compression efficiencies, prediction dependencies, and delay constraints. In general, I, P and B frames, in that order, have increasing coding efficiency and therefore decreasing encoded frame size.

The sequence of frame types (I, P or B) determines the prediction dependencies among frames and the number of subsequent frames that depend on each particular frame. In one embodiment of the present invention, the number of subsequent, dependent frames is used to characterize the relative importance of each encoded frame. For example, an I-frame may be characterized as having the highest relative importance, because decoding (or predicting or constructing) the other frames in a Group of Pictures (GOPs) is dependent, either directly or indirectly, on the I-frame. Similarly, the first P-frame in a GOP may have a higher relative importance than a subsequent P-frame because the decoding of more frames, including the second P-frame, may be dependent on the first P-frame. On the other hand, B-frames may be considered to have the lowest relative importance because decoding of other frames is not dependent on B-frames.

Referring to FIG. 1, a typical encoding order is shown for a plurality of blocks of data (e.g., frames). If these blocks of data are transmitted in the encoding order, then the different frames have different lengths of time until their playback (display) time. However, because of the prediction dependencies of the encoded frames, some frames (e.g., I-frames and P-frames) may need to arrive at the decoder (e.g., at a destination node) before their playback time.

Figure 2:
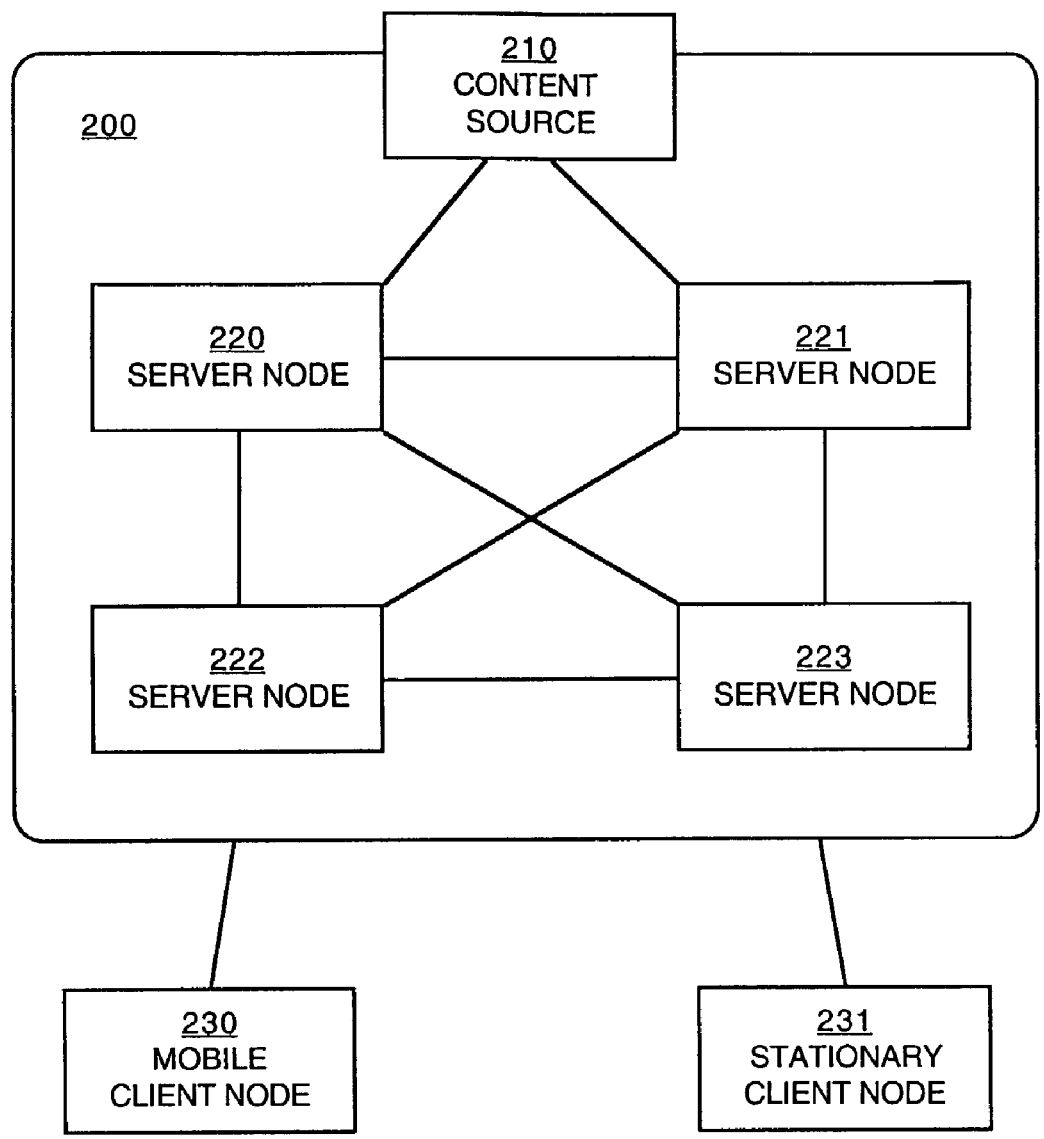
FIG. 2 is a representation of a network upon which embodiments of the present invention may be implemented.

FIG. 2 is a representation of a network 200 upon which embodiments of the present invention may be implemented. In the present embodiment, network 200 includes a content source 210 coupled to a number of interconnected server nodes 220, 221, 222 and 223. The interconnections between these nodes, including content source 210, may be a wired connection, a wireless connection, or a combination thereof. There may of course be a greater or lesser number of content sources and server nodes than those illustrated. Generally speaking, content source 210 and server nodes 220-223 are types of devices that provide the capability to process and store data, and to send and receive such data. Accordingly, server nodes 220-223 may be computer systems as well as other types of devices that may not be typically considered computer systems but have similar capabilities.

In communication with network 200 are client devices such as mobile client node 230 and stationary client node 231. There may be a greater or lesser number of client nodes than those illustrated. The client nodes 230 and 231 may be coupled to the network 200 via a wired connection, a wireless connection, or a combination thereof. In general, network 200 provides the capability to provide data from content source 210, and/or from any of the intermediate server nodes 220-223, to the client nodes 230-231. In one embodiment, network 200 is for streaming media data to client nodes 230 and/or 231.

According to the various embodiments of the present invention, network performance is represented by a network performance model. Embodiments of the present invention are described herein in which the network performance model utilizes probability density functions to associate a probability to an amount of delay; however, the model for representing network performance may be instead a probability mass function or some other means. In general, a probability density function describes delays modeled in relatively continuous values, while a probability mass function describes delays modeled in discrete values.

In addition, according to the various embodiments of the present invention, a network performance model can be generated whether or not the exact characteristics of a network path or paths are known, and/or whether or not the characteristics of a path or paths are known in advance. That is, for example, the network performance model may include some degree of estimation, depending on the amount of information available about path characteristics, and recognizing that information about some portions of the overall path may be more available than information about other portions. Also, as will be seen, the network performance model may be generated either in advance or "on-the-fly," and may be modified (again, either in advance or on-the-fly) as updated or new performance information becomes available.

Figure 3:
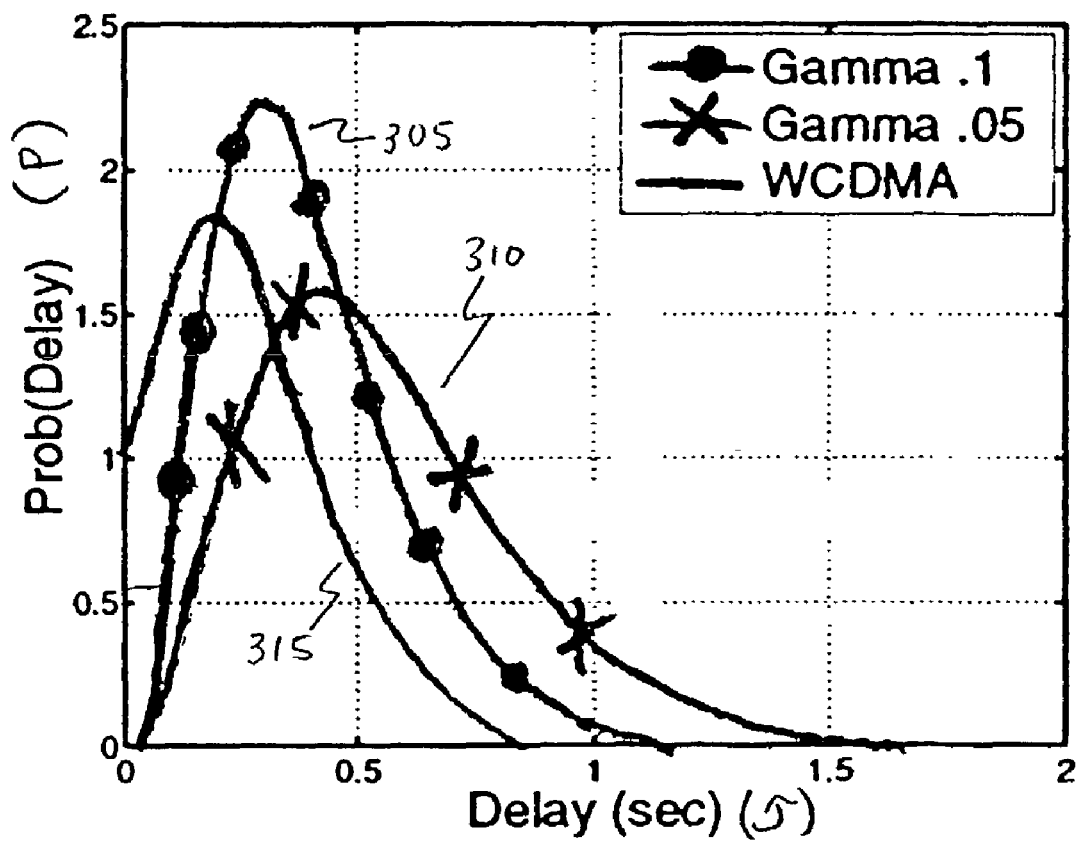
FIG. 3 illustrates exemplary probability density functions characterizing network performance according to one embodiment of the present invention.

FIG. 3 illustrates exemplary probability density functions (PDFs) 305, 310 and 315 that may be used to characterize network performance (e.g., network delays) according to one embodiment of the present invention. PDFs 305 and 310 correspond to a wired network path and PDF 315 corresponds to a wireless network path.

In a wired network, the path through the network may traverse a number of links and nodes, as exemplified by FIG. 2. According to one embodiment of the present invention, the delays associated with the node-to-node path through the network are modeled as a propagation delay of the data packets traveling over the links, the queue delay introduced by the intermediate nodes (e.g., intermediate server nodes, routers, switches, etc.), the retransmission delay due to lost packets, or some combination thereof.

In one embodiment, the initial propagation delay can be modeled as a constant κ, and the queue delay and retransmission delay can be modeled as a PDF. In one such embodiment, for n nodes, the PDF of the combined queue and retransmission delay τ is given by:

$$P(\tau) = \frac{\alpha}{\Gamma(n)} (\alpha\tau)^{n-1} e^{-\alpha\tau}; \quad (1)$$

$$\text{where } \Gamma(n+1) = \int_0^\infty y^n e^{-y} \, dy; n > -1.$$

In equation (1), $P(\tau)$ is the probability of a delay τ (here, the delay is measured in seconds). This PDF has a mean $\mu=n/\alpha$ and variance $\sigma^2=n/\alpha^2$. Note that for integer values of n, $\Gamma(n+1)=n!$ and the PDF reduces to the Erlang PDF. PDF 305 of FIG. 3 is a plot of equation (1) for n=5 and a variance of 0.1. PDF 310 of FIG. 3 is a plot of equation (1) for n=5 and a variance of 0.05.

Although a particular formulation of a PDF is used, it is appreciated that other PDFs may be used to characterize network performance; that is, PDF formulations other than equation (1) may be used in accordance with the present invention. Also, as mentioned above, the network may be characterized by means other than a PDF.

With regard to wireless networks, in one embodiment, a queue and retransmission delay model is derived for a WCDMA (Wideband Code Division Multiple Access) channel based on the 3GPP (Third Generation Partnership Project) Radio Link Control specification. However, it is appreciated that these delays may be alternatively modeled in accordance with the present invention. In the present embodiment, the probability of various amounts of delay (in seconds) is provided by PDF 315, based on a channel with ten percent packet loss, 160 millisecond round-trip time, and ten maximum retransmissions.

Figure 4A:
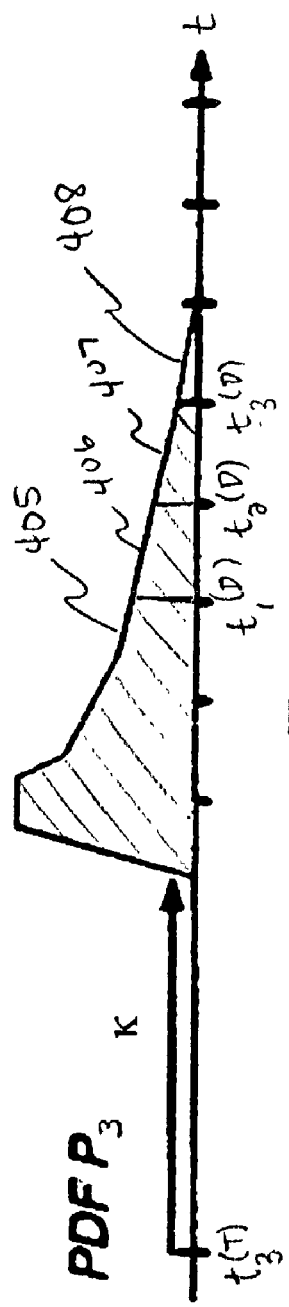
FIGS. 4A, 4B and 4C are exemplary probability density functions characterizing the probability that a frame of data will arrive on time, in accordance with one embodiment of the present invention.
Figure 4B:
Figure 4C:
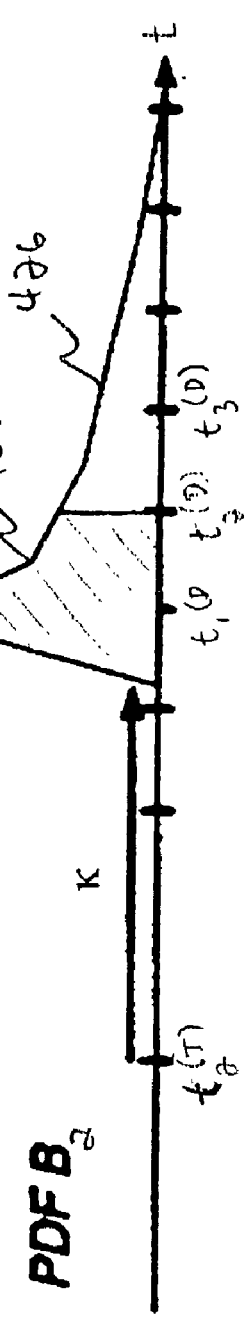

FIGS. 4A, 4B and 4C are exemplary probability density functions characterizing the probability that a frame of data will arrive on time at a destination node, in accordance with one embodiment of the present invention. In the present embodiment, a frame is considered to be late when the frame itself, or one of the frames it depends upon (either directly or indirectly), is late. For example, a P-frame may be considered late if it arrives late, or if the I-frame upon which it depends arrives late (even if the P-frame is on time). A B-frame predicted by two preceding P-frames may be considered late if either of the P-frames, or any of the frames that the P-frames depend on (e.g., another P-frame or an I-frame), is late.

In one embodiment, the probability $\lambda_p$ that a frame p will be late is given by:

$$\lambda_p = 1 - T(t_p^{(D)} - t_p^{(T)}) \prod_{q \in S_p} T(t_p^{(D)} - t_q^{(T)}); \quad (2)$$

where $T(t)$ denotes the cumulative distribution function of the queue and retransmission delay; $t_p^{(D)}$ and $t_p^{(T)}$ denote the display and transmission times, respectively, of frame p; and $S_p$ denotes the set of frames that frame p is dependent on.

Equation (2) conveys that, for a frame p to be properly decoded and displayed, both it and all the frames it is dependent on (either directly or indirectly) should arrive before the display time for frame p. Note that, for an intelligent decoder, it is not necessary for the frames in $S_p$ to be displayed on time in order for frame p to be displayed on time. Instead, the decoder can make use of late dependent frames as long as they arrive before the display time of frame p. Also note that, with modification, equation (2) can be used to calculate the probability that a frame p will be on time; that is, the probability that a frame p will be on time is given by $1-\lambda_p$.

With reference also to FIG. 1, FIG. 4A shows an exemplary PDF of the arrival time of a frame $P_3$, FIG. 4B shows an exemplary PDF of the arrival time of a frame $B_1$, and FIG. 4C shows an exemplary PDF of the arrival time of a frame $B_2$. In FIG. 4A, the area 405 shows the probability that frame $P_3$ will arrive on time in order to contribute to the decoding of frame $B_1$, for the on-time time playback of frame $B_1$. The combination (sum) of areas 405 and 406 show the probability that frame $P_3$ will arrive on time in order to contribute to the decoding of frame $B_2$ for the on-time playback of frame $B_2$. The combination (sum) of areas 405, 406 and 407 show the probability that frame $P_3$ will arrive on time for its respective playback time, while the area 408 shows the probability that frame $P_3$ will be late. In FIGS. 4B and 4C, the areas 415 and 425, respectively, show the probability that the encoded frames $B_1$. and $B_2$ will arrive on time for their respective playback times, while the areas 416 and 426, respectively, show the probabilities that the encoded frames will be late.

When the encoded video data are streamed to a destination node (e.g., a client node), the quality of the reconstructed video can depend on the time the encoded video frames are received in relation to their playback time. If an encoded frame is received late, it cannot be decoded in time to be displayed. However, a late frame may still be useful because it may be used to construct other frames that are dependent on it. Therefore, the quality of the reconstructed video can be characterized according to (1) whether each encoded frame is received before its playback time, and (2) the actual delay as it may affect other (dependent) frames. Note that, as described above in conjunction with FIG. 1, encoded frames have different delivery conditions and may affect error propagation differently, depending on frame type and the GOP structure.

Accordingly, in one embodiment, the quality of the reconstructed video is quantified by computing a measure of distortion. In general, in one embodiment, distortion is measured by counting the number of frames that cannot be displayed at their respective playback times. In one such embodiment, the distortion $D_G$ can be given by:

$$D_G = \sum_{p \in G} \lambda_p. \quad (3)$$

As will be seen, in the present embodiment, it is desirable to select an order of streaming that minimizes $D_G$, considering perhaps other system constraints such as the buffer size at the receiving node or the accessibility of the sending node to the media data. Specifically, in accordance with the present invention, an order of streaming other than the encoding order (FIG. 1) may be selected. It is appreciated that other definitions and measures of distortion may be used in accordance with the present invention.

It is also appreciated that, in another embodiment, the quality of the reconstructed video can be measured by counting the number of frames (including frames they are dependent on) that arrive on time and hence can be displayed at their respective playback times. For example, a quality $Q_G$ can be given by:

$$Q_G = \sum_{p \in G} (1 - \lambda_p). \quad (4)$$

In this case, it would be desirable to select an order of streaming that maximizes $Q_G$, considering perhaps other system constraints such as the buffer size at the receiving node or the accessibility of the sending node to the media data.

Figure 5A:
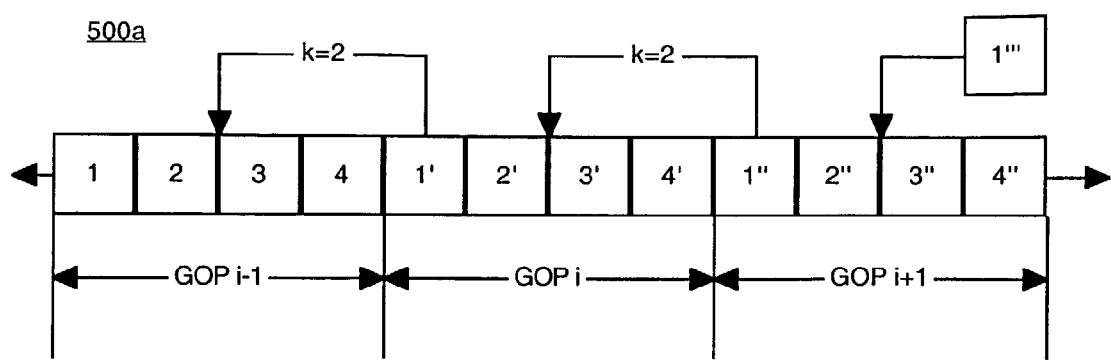
FIG. 5A illustrates frames of data in an initial order being reordered according to one embodiment of the present invention.

FIG. 5A illustrates frames of data 500*a* being reordered from an initial order according to one embodiment of the present invention. FIG. 5A illustrates three GOPs i−1, i, and i+1, each GOP having four frames or blocks of data. It is appreciated that different numbers of GOPs having different numbers of frames per GOP may be used in accordance with the present invention.

In the present embodiment, the frames 500*a* have a periodic GOP structure; that is, the order of the frames within each GOP is repeated from one GOP to the next. While this can be a common GOP structure, it is appreciated that the features of the present invention may be utilized with other than a periodic GOP structure.

In one embodiment, frames 500*a* are reordered for streaming using what are referred to herein as "elementary operations." In an elementary operation, the transmission of a frame is moved ahead a certain number of positions (or time slots) relative to the initial order. The number of positions the frame is moved is denoted by k. In the example of FIG. 5A, the transmission of frame 1' is moved ahead two positions (k=2). In this example, the transmission of frame 1' is moved from one GOP to another (from GOP i to GOP i−1); however, it is appreciated that frames may be moved forward within a GOP.

Figure 5B:
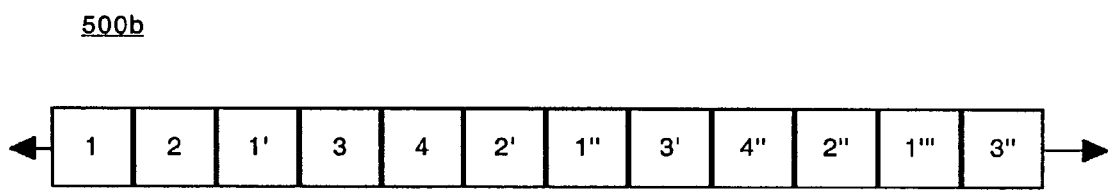
FIG. 5B illustrates frames of data after they have been reordered according to one embodiment of the present invention.

FIG. 5B illustrates frames of data 500*b* after they have been reordered according to one embodiment of the present invention. According to this embodiment, in an elementary operation, when the transmission of a frame is moved ahead a particular number of positions, then a same number of frames are moved backward one position each. For instance, with k=2, meaning that the transmission of one frame is moved forward two positions, then two other frames are moved backward one position each. In the example of FIGS. 5A and 5B, frames 3 and 4 are moved backward one position each.

In the present embodiment, because of the periodic structure of the GOPs, when an elementary operation is performed for one GOP, it can be readily duplicated across all of the GOPs. Thus, with reference again to FIGS. 5A and 5B, with the movement of frame 1' (e.g., the first frame in GOP i) by two positions, the first frame in each of the other GOPs (e.g., frames 1" and 1''') are similarly moved by two positions, and frames 3' and 4' in GOP i and frames 3" and 4" in GOP i+1 are each moved back one position.

The use of elementary operations with periodic GOP structures offers a number of advantages. First, an elementary operation ensures that, for each GOP, the net movement of all of the frames is zero. Second, the resulting transmission order remains periodic, so that the distortion $D_G$ (or the quality $Q_G$) associated with the new streaming order is readily computed based on a single GOP.

Although described for an elementary operation, it is appreciated that the features of the present invention may be utilized with other reordering schemes. For example, the position of one frame may be swapped for the position of another frame.

Figure 6A:
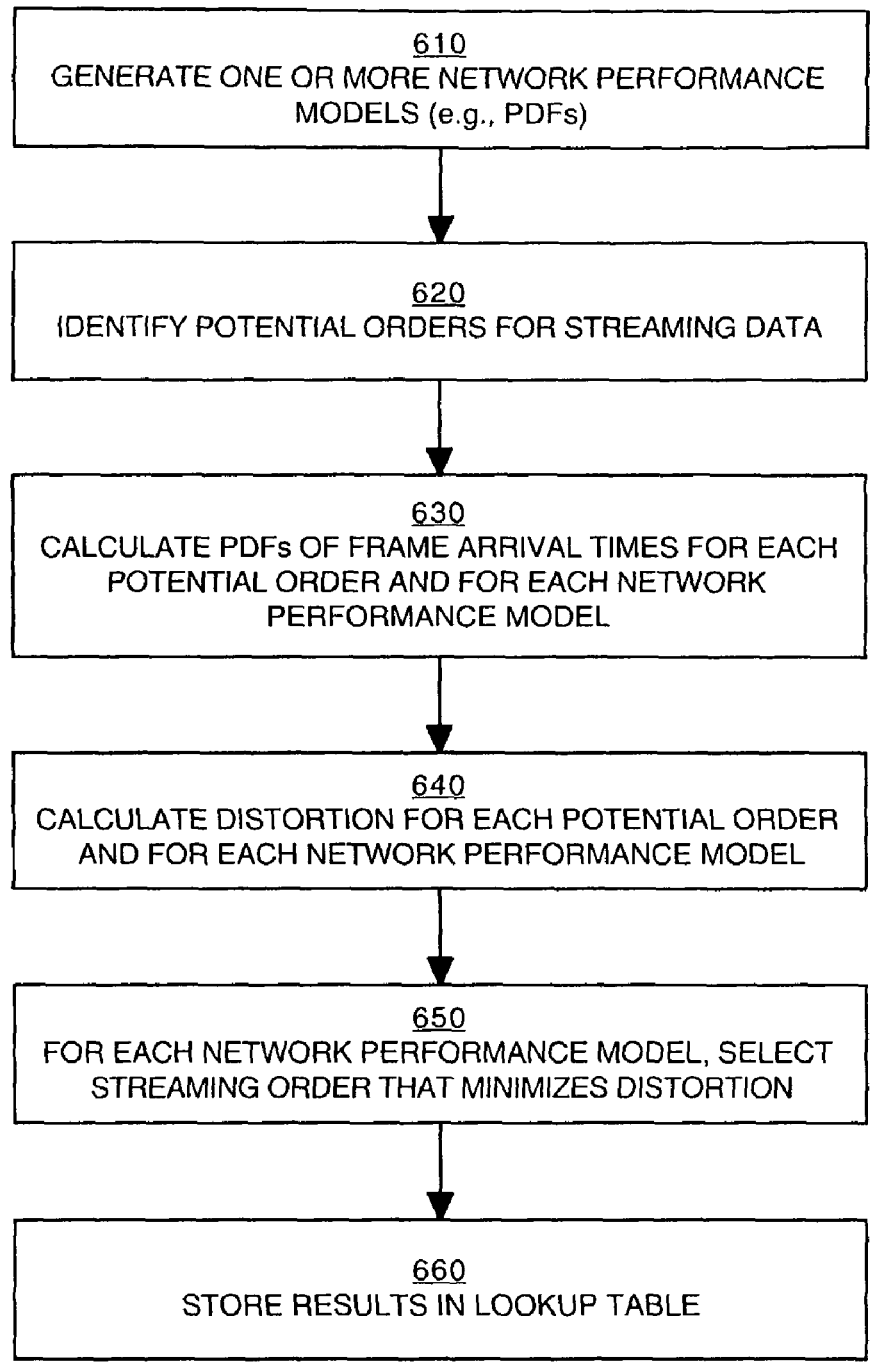
FIG. 6A is a flowchart of a process for determining various orders for streaming data according to one embodiment of the present invention.

FIG. 6A is a flowchart 600 of a method for determining various orders for streaming data according to one embodiment of the present invention. Although specific steps are disclosed in flowchart 600, such steps are exemplary. That is, embodiments of the present invention are well-suited to performing various other steps or variations of the steps recited in flowchart 600. It is appreciated that the steps in flowchart 600 may be performed in an order different than presented, and that not all of the steps in flowchart 600 may be performed. All of, or a portion of, the methods described by flowchart 600 may be implemented using computer-readable and computer-executable instructions which reside, for example, in computer-usable media of a computer system. Generally, flowchart 600 is implemented by content source 210 or by a server node 220-223 of FIG. 2.

As mentioned above, a network performance model can be represented using a PDF or using some other means. For simplicity of discussion, an embodiment is described in which PDFs are utilized for the network performance model. Also as mentioned above, the network performance model (e.g., PDFs) can be generated based on the amount of network performance information that is available. In addition, as new (e.g., updated) network performance information becomes available, the network performance model (e.g., PDFs) can be modified. Furthermore, it is understood that aspects of the process described by flowchart 600 may be performed either in advance or on-the-fly. Moreover, although described for a plurality of network performance PDFs, it is appreciated that a single network performance PDF may be generated and used.

In step 610 of FIG. 6A, in the present embodiment, a number of PDFs characterizing the performance (e.g., the delays) of the network path between a sending node and a receiving node are generated. The path may include a number of intervening nodes and a number of links between nodes. As mentioned, information characterizing the network along the entire path may or may not be available; in either case, PDFs can be generated. These PDFs are exemplified by the PDFs of FIG. 3. Various PDF formulations, such as the formulation of equation (1), may be used to generate the PDFs. In addition, variables within a PDF formulation may be varied as well. In general, according to the present embodiment, the result of step 610 is a plurality of PDFs such as those of FIG. 3.

In step 620 of FIG. 6A, potential orders of streaming, different from the initial and intended order of streaming, are identified. As noted above, the initial (intended) order of streaming is typically the encoding order. In one embodiment, each of the possible streaming orders (e.g., each possible combination of frames) can be considered for evaluation. However, the number of possible streaming orders to be evaluated can be reduced. For example, with a periodic GOP structure such as that described in conjunction with FIGS. 5A and 5B, only the possible streaming orders that arise by reordering the frames in a single GOP need to be considered for evaluation. Also, the number of streaming orders to be evaluated can be reduced by limiting the number of positions that a frame may be moved, referred to herein as an "advancement range;" for example, the transmission time of a frame may not be advanced more than eight time slots or positions. Moreover, a limitation can be included that the transmission times of certain frames may not be moved ahead to an earlier time slot; for example, possible streaming orders in which B-frames are moved ahead may be eliminated because other frames are not dependent on B-frames. In general, it is not necessary to consider every potential streaming order, but only those that offer the potential, or the greatest potential, for reducing distortion and improving quality.

In step 630 of FIG. 6A, in the present embodiment, PDFs of frame arrival times are calculated for each potential streaming order (or for a selected subset of the potential streaming orders) evaluated in step 620, and for some or all of the network performance PDFs evaluated in step 610. In one embodiment, the formulation of equation (3) is used to determine PDFs of arrival times, such as those exemplified by FIGS. 4A, 4B and 4C. From these PDFs of arrival times, the probability that a frame will be on time, or the probability that a frame will be late, can be determined.

In step 640 of FIG. 6A, in one embodiment, the expected amount of distortion associated with the reconstructed image is calculated for each of the potential streaming orders and for each network performance PDF under consideration, using the arrival time PDFs of step 630. In one such embodiment, the expected amount of distortion is determined using equation (3). In another embodiment, equation (4) can be used to calculate the expected quality of the reconstructed image for each of the potential streaming orders and for each of the network performance PDFs.

In step 650, in one embodiment, for each network performance PDF evaluated, the streaming order that minimizes distortion is selected. Alternatively, for each network performance PDF, the streaming order that maximizes quality is selected. In step 660, in one embodiment, the streaming orders selected in step 650 are stored in a lookup table or in some other storage format. Thus, the lookup table will include a selected streaming order for each of the network performance PDFs evaluated.

In an alternative embodiment of the present invention, an improved streaming order may also be determined based on the relative importance of each encoded frame. For example, as described above in conjunction with FIG. 1, an I-frame may be characterized as having the highest relative importance, because decoding of (predicting or constructing) the other frames in a Group of Pictures (GOPs) is dependent, either directly or indirectly, on the I-frame. Similarly, the first P-frame in a GOP may have a higher relative importance than a subsequent P-frame because the decoding of more frames, including the second P-frame, may be dependent on the first P-frame. On the other hand, B-frames may be considered the lowest relative importance because decoding of other frames is not dependent on B-frames. Thus, a streaming order may be determined in which the frames of relatively high importance are transmitted first. Also, the relative importance of the frames can be considered when identifying the possible combinations of streaming orders to be evaluated (refer to step 620 of FIG. 6A).

It is understood that the process illustrated by flowchart 600 can be reduced to a process in which only a single network performance PDF is evaluated. In this case, a single streaming order corresponding to the evaluated network performance PDF is selected. As such, this latter approach may lend itself more readily to a dynamic (e.g., on-the-fly) determination of an improved streaming order. For example, as actual network performance characteristics are obtained, the actual network performance can be modeled by a PDF and an improved streaming order can then be determined.

The former approach, in which multiple network performance PDFs are precomputed and the results stored in a lookup table, also lends itself to dynamic, on-the-fly determinations of improved streaming orders. For example, based on measurements of actual network performance, a particular network performance PDF can be selected, and the associated streaming order retrieved from the lookup table.

Figure 6B:
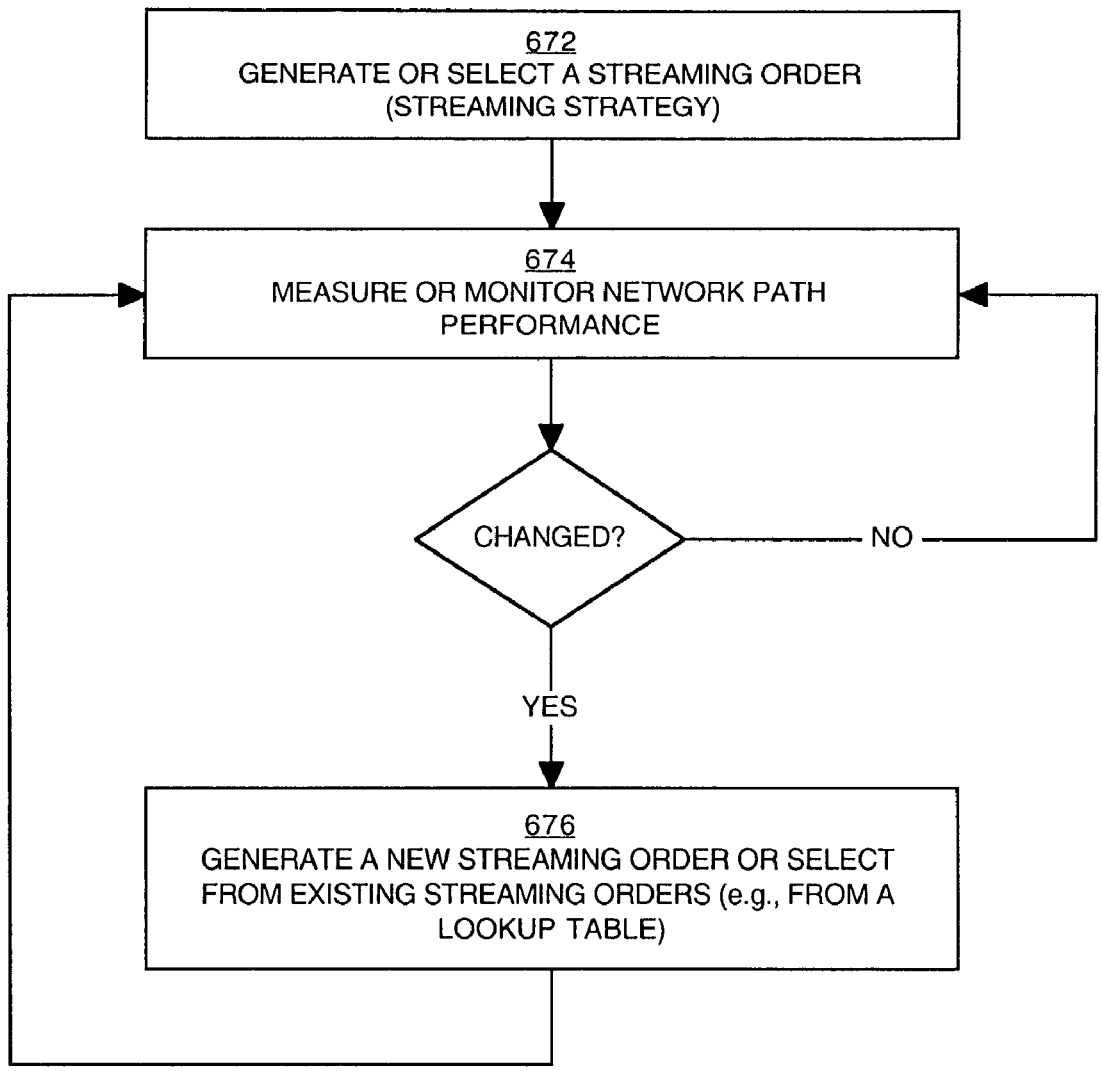
FIG. 6B is a flowchart of a process for updating streaming order according to one embodiment of the present invention.

FIG. 6B is a flowchart 670 of a process for updating a streaming strategy (e.g., the order of streaming) according to one embodiment of the present invention. Although specific steps are disclosed in flowchart 670, such steps are exemplary. That is, embodiments of the present invention are well-suited to performing various other steps or variations of the steps recited in flowchart 670. It is appreciated that the steps in flowchart 670 may be performed in an order different than presented, and that not all of the steps in flowchart 670 may be performed. All of, or a portion of, the methods described by flowchart 670 may be implemented using computer-readable and computer-executable instructions which reside, for example, in computer-usable media of a computer system. Generally, flowchart 670 is implemented by content source 210 or by a server node 220-223 of FIG. 2.

In step 672 of FIG. 6B, in the present embodiment, a streaming strategy (an order of streaming) is generated or selected. For example, in one embodiment, the process described by flowchart 600 of FIG. 6A can be used to generate a streaming order for a particular network performance model. As mentioned above, the process described by flowchart 600 is readily adapted to the case in which a single network performance model (e.g., a single network performance PDF) is to be used. The network performance model can be based on either actual (e.g., measured) or estimated network performance characteristics (e.g., delays).

In another embodiment, based on either actual or estimated network performance characteristics, a streaming order is selected from, for example, a lookup table. As described above, the process described by flowchart 600 (FIG. 6A) can be used to generate a number of streaming orders that are each associated with a particular network performance model (e.g., PDF). The streaming orders that are so generated are then stored in a lookup table, indexed by the PDF with which they are associated. The actual or estimated network performance characteristics can be used as the basis for selecting one of the streaming orders from the lookup table.

In step 674 of FIG. 6B, in the present embodiment, network performance (e.g., along the path from the sending node to the destination node) can be monitored or measured. If the network performance characteristics have not changed, or have not changed by a predetermined (threshold) amount, then the streaming order generated or selected in step 672 continues to be used. Otherwise, flowchart 670 proceeds to step 676.

In step 676, in the present embodiment, the new or updated network performance characteristics can be used to generate a new streaming order or they can be used as the basis for selecting a streaming order from existing streaming orders (for example, the streaming orders previously determined and stored in a lookup table). The new streaming order can be generated or selected as described above.

FIG. 7A illustrates frames of data 700a in an initial order of streaming according to one embodiment of the present invention. FIG. 7A represents only a portion of a stream of data. The initial order may be the order in which the media data were encoded. Alternatively, the initial order may be the order in which the media data are received by a node (e.g., a server node). In either case, according to the various embodiments of the present invention, the initial order may be changed to reduce distortion (improve quality) at the destination node.

FIGS. 7B, 7C and 7D illustrate frames of data 700b, 700c and 700d, respectively, after they have been reordered according to different network performance characteristics in accordance with one embodiment of the present invention. FIGS. 7B, 7C and 7D represent only a portion of a stream of data. The order of streaming of FIG. 7B is based on PDF 305 of FIG. 3. The order of streaming of FIG. 7C is based on PDF 310 of FIG. 3. The order of streaming of FIG. 7D is based on PDF 315 of FIG. 3.

Referring to FIGS. 7A and 7B, for example, different strategies may be used to implement the transition from the initial streaming order 700a to a different streaming order such as 700b. In one such implementation, some number of frames from the initial streaming order 700a may be streamed before the transition to streaming order 700b begins. For example, the first seven frames (frames $B_{10}'$ through $P_6$) of 700a may be streamed. Frame $I_0''$ is then streamed after $P_6$ (here, frame $I_0''$ is the first frame from the next GOP to be moved ahead), and the other frames of 700a (beginning at frame $B_4$) are then moved back one position. Note that $I_0''$ is moved ahead eight positions, and that eight frames are moved back one position each (an elementary operation as described above). Frame $B_4$ of 700a is next streamed, then frame $P_3''$ (the next frame from the next GOP to be moved ahead) is streamed. This type of implementation approach continues, perhaps over a number of GOPs, until the transition to the new order of streaming (e.g., 700b) is complete. In general, the transition is completed within a finite number of frames over a relatively small number of GOPs. In the example of FIGS. 7A and 7B, the transition from 700a to 700b is completed by the third GOP.

It is appreciated that other approaches may be used to implement a new order of streaming according to the various embodiments of the present invention. For example, in particular when data are already resident on a node in entirety, an order of streaming corresponding to the network performance characteristics can be precomputed and the data ordered for streaming accordingly. If a slight distortion can be tolerated, the transition from one order of streaming to another can be made abruptly, perhaps at the seam between two consecutive GOPs.

Figure 8A:
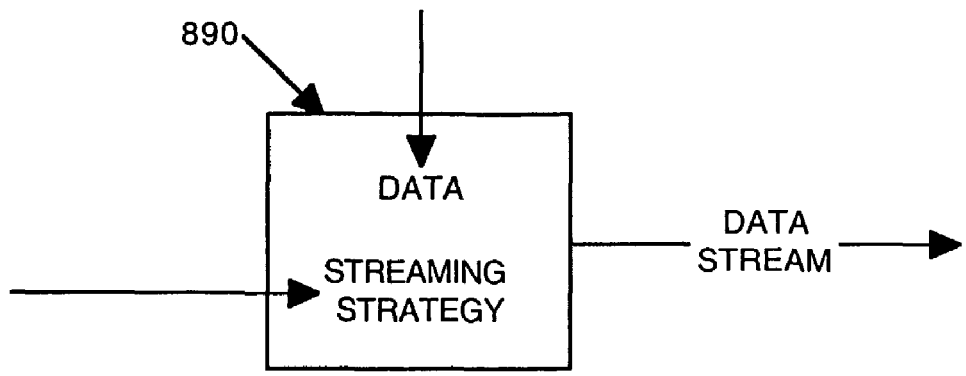
FIG. 8A is a data flow diagram of a method for streaming media data according to one embodiment of the present invention.

FIG. 8A is a data flow diagram of a method for streaming media data according to one embodiment of the present invention. In the present embodiment, node 890 may be, for example, content source 210 or a server node 220-223 of FIG. 2.

With reference to FIG. 8A, in various embodiments, node 890 receives data (e.g., media data) or the data are resident on node 890. Generally speaking, node 890 has access to media data. An initial streaming order is typically associated with the media data as the data are received by node 890, or as the data reside on node 890. However, it is not necessary that an initial streaming order be associated with the media data as it is received by, or as it resides on, node 890 because, according to the various embodiments of the present invention, node 890 will order (or reorder) the media data for streaming using a streaming strategy that is determined, or selected, based on the performance characteristics of the content delivery network. The streaming strategy may be determined by node 890 or provided by another node, or selected by node 890 from a number of precomputed streaming strategies either determined by node 890 or provided by another node.

Figure 8B:
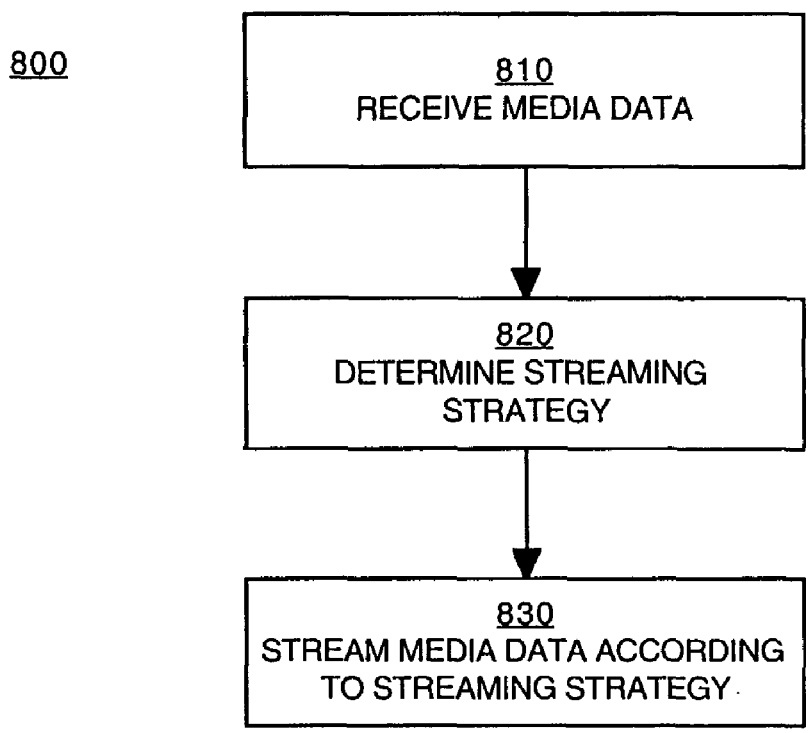
FIG. 8B is a flowchart of a method for streaming media data according to one embodiment of the present invention.

FIG. 8B is a flowchart 800 of a method for streaming media data according to one embodiment of the present invention. Although specific steps are disclosed in flowchart 800, such steps are exemplary. That is, embodiments of the present invention are well-suited to performing various other steps or variations of the steps recited in flowchart 800. It is appreciated that the steps in flowchart 800 may be performed in an order different than presented, and that not all of the steps in flowchart 800 may be performed. All of, or a portion of, the methods described by flowchart 800 may be implemented using computer-readable and computer-executable instructions which reside, for example, in computer-usable media of a computer system. Generally, flowchart 800 is implemented by node 890 of FIG. 8A.

In step 810 of FIG. 8B, in the present embodiment, data (e.g., media data) are received at a node. The data may be received in entirety and stored before streaming, or the data may be received "at one end" as the data are being streamed "out the other end." Generally speaking, the data are accessible by the node, either from another node or from local memory. In the present embodiment, the data are in an initial streaming order.

In step 820, a streaming strategy that describes an order of streaming according to the performance characteristics of the network is determined. The streaming strategy may be a precomputed strategy received from another node or resident in local memory. The streaming strategy may instead be computed on-the-fly by the node.

In step 830, the data are streamed according to the streaming strategy determined (selected or generated) in step 820.

Figure 9A:
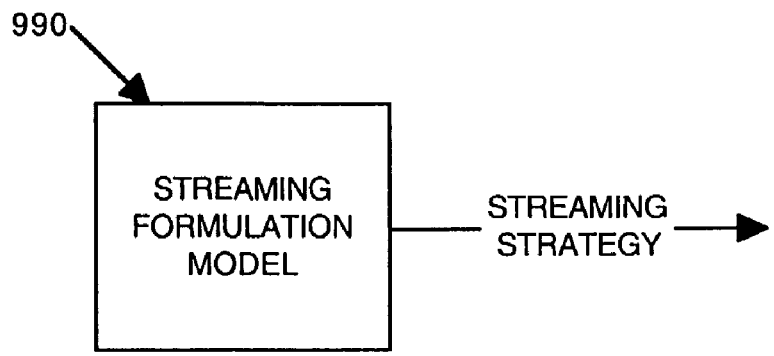
FIG. 9A is a data flow diagram of another method for streaming media data according to one embodiment of the present invention.

FIG. 9A is a data flow diagram of a method for streaming media data according to another embodiment of the present invention. In the present embodiment, node 990 may be, for example, content source 210 or a server node 220-223 of FIG. 2. In the present embodiment, node 990 employs a streaming formulation model, such as that described in conjunction with FIG. 6A, to determine one or more streaming strategies. The streaming strategy determined (selected) by node 990 can be utilized by node 990 or sent to another node.

Figure 9B:
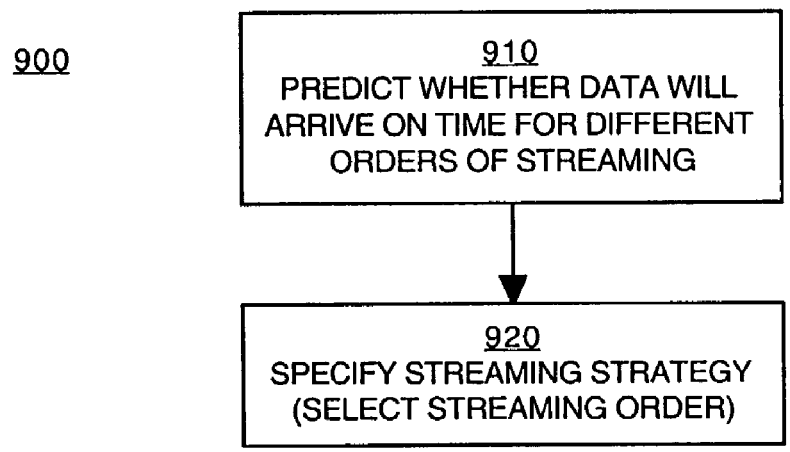
FIG. 9B is a flowchart of another method for streaming media data according to one embodiment of the present invention.

FIG. 9B is a flowchart 900 of a method for streaming media data according to another embodiment of the present invention. Although specific steps are disclosed in flowchart 900, such steps are exemplary. That is, embodiments of the present invention are well-suited to performing various other steps or variations of the steps recited in flowchart 900. It is appreciated that the steps in flowchart 900 may be performed in an order different than presented, and that not all of the steps in flowchart 900 may be performed. All of, or a portion of, the methods described by flowchart 900 may be implemented using computer-readable and computer-executable instructions which reside, for example, in computer-usable media of a computer system. Generally, flowchart 900 is implemented by node 990 of FIG. 9A.

In step 910 of FIG. 9B, in one embodiment, a prediction is made with regard to the probability that frames of data will arrive on time at a destination node. In one such embodiment, this is accomplished by: i) generating or selecting a network performance model (e.g., a PDF) that characterizes the performance of the network; ii) identifying one or more potential streaming orders; and then iii) determining PDFs characterizing the arrival times of the frames. As described above, the prediction can be made using a number of different network performance PDFs or other types of network performance models.

In step 920, in the present embodiment, one of the potential streaming orders evaluated in step 910 is selected. In one embodiment, this is accomplished by selecting the streaming order that minimizes distortion of the reconstructed video image at the destination node (or by maximizing the quality of the image). A different streaming order may be selected for each of the network performance PDFs considered. The selected streaming order can be used by the node to stream data, or sent to another node for implementation.

In summary, in its various embodiments, the present invention provides a method and system thereof for determining and implementing a streaming strategy based on frame reordering. The features of the present invention are well suited for, but not limited to, networks with significant delay variations. The features of the present invention are also well suited for, but not limited to, predictively encoded video data. According to the various embodiments of the present invention, the on-time arrival of data at a destination node can be improved, resulting in improved display quality in the case of video data. Experiment results show that the number of late frames can be reduced by a substantial amount, on the order of 14 to 23 percent for selected cases.

Embodiments of the present invention are thus described. While the present invention has been described in particular embodiments, it should be appreciated that the present invention should not be construed as limited by such embodiments, but rather construed according to the following claims.

What is claimed is:

1. A method of streaming media data in a network, said method comprising:
   receiving media data comprising blocks of data in a first order;
   reordering said blocks of data in a second order different from said first order, said second order corresponding to an order that is selected according to performance characteristics, wherein said performance characteristics comprise delays associated with said path, wherein said delays comprise at least one of a propagation delay associated with data traveling over links in said path, a queue delay associated with nodes encountered on said path, and a retransmission delay associated with retransmitting lost data; and
   streaming said blocks of data in said order that is selected according to said performance characteristics of a path used for said streaming.

2. The method of claim 1 wherein said performance characteristics comprise data packet losses.

3. The method of claim 1 wherein said blocks of data are characterized according to their relative importance, wherein said order is also selected according to said relative importance.

4. The method of claim 1 wherein said blocks of data comprise frames of video data.

5. The method of claim 4 wherein said frames are predictively encoded.

6. The method of claim 1 wherein said streaming further comprises:
   sending a block of data ahead of time relative to when it would have been sent according to an initial intended order of streaming, wherein said block of data moves ahead a first number of positions relative to its position in said initial intended order.

7. The method of claim 6 further comprising:
   delaying transmission of a second number of other blocks of data, wherein said first number and said second number are equal.

8. A method of streaming media data comprising blocks of data, said method comprising:
   predicting whether said blocks of data will arrive at a destination node on time for different orders of streaming; said predicting comprising:
      determining probabilities of various lengths of delay associated with a path to said destination node;
      varying said probabilities resulting in a plurality of network performance models that characterize network performance;
      determining, for each of said network performance models and for each of a number of different orders of streaming, a probability that said blocks of data will arrive at said destination node on time; and
      selecting, for each of said network performance models, an order of streaming for which said probability that said blocks of data will arrive at said destination node on time is maximized; and
   specifying an order for streaming said blocks of data using results from said predicting.

9. The method of claim 8 wherein some portion of said various lengths of delay is estimated.

10. The method of claim 8 wherein some portion of said various lengths of delay is based on measurements of actual performance along said path.

11. The method of claim 8 wherein a network performance model comprises a probability density function.

12. The method of claim 8 wherein a network performance model comprises a probability mass function.

13. The method of claim 8 further comprising:
    for each of said network performance models, storing in a lookup table said order of streaming for which said probability is maximized.

14. The method of claim 13 further comprising:
    determining a network performance model that characterizes delays associated with said path to said destination node; and
    selecting from said lookup table an order of streaming corresponding to said network performance model.

15. The method of claim 8 wherein said blocks of data are interrelated, wherein said predicting considers dependencies between said blocks.

16. The method of claim 15 wherein said blocks of data comprise frames of video data that are predictively encoded.

17. The method of claim 8 wherein said blocks of data are separated into groups of blocks, wherein blocks of data in a group are ordered in a periodic arrangement that is repeated from group to group, wherein said predicting is performed for a single group for each of said different orders of streaming.

18. The method of claim 8 wherein said blocks of data are associated with an initial streaming order, wherein a different order of streaming is achieved by moving a block of data forward a first number of positions relative to said initial streaming order.

19. The method of claim 18 wherein said different order of streaming is achieved by also moving a second number of blocks of data backward at least one position each relative to said initial streaming order, wherein said first number and said second number are equal.

20. The method of claim 18 wherein said first number is limited to a predetermined value.

21. The method of claim 8 further comprising:
    measuring performance characteristics of a path to said destination node; and using measured performance characteristics in said predicting.

22. A method of streaming blocks of data over a network, said method comprising:
receiving said blocks of data in a first order;
selecting an order for streaming said blocks of data, said order determined according to performance characteristics of a path used for said streaming, said selecting comprising:
determining a network performance model that characterizes delays associated with said path;
selecting from a lookup table said order of streaming corresponding to said network performance model; and
reordering said blocks of data in a second order different from said first order, said second order corresponding to said order of streaming corresponding to said network performance model; and
streaming said blocks of data according to said second order.

23. The method of claim 22 wherein said blocks of data constitute media data.

24. The method of claim 23 wherein said blocks of data comprise predictively encoded media data.

25. The method of claim 22 wherein said performance characteristics comprise delays associated with said path.

26. The method of claim 25 wherein said delays comprise at least one of a propagation delay associated with data traveling over links in said path, a queue delay associated with nodes encountered on said path, and a retransmission delay associated with retransmitting lost data.

27. The method of claim 22 comprising:
predicting whether said blocks of data will arrive at a destination node on time for different orders of streaming; and
specifying an order for streaming said blocks of data using results from said predicting.

28. The method of claim 22 comprising:
measuring network performance characteristics associated with said path; and
selecting an order of streaming from said lookup table corresponding to measured network performance characteristics.

29. A non-transitory computer-usable storage medium having computer-readable program code embodied therein for causing a computer system to perform a method of streaming media data comprising blocks of data comprising:
determining a probability of whether said blocks of data will arrive late at a destination node for different orders of streaming, said determining said probability comprising:
determining probabilities of various lengths of delay associated with a path to said destination node;
varying said probabilities resulting in a plurality of network performance models that characterize delays associated with said path to said destination node;
determining, for each of said network performance models and for each of said different orders of streaming and for each of a number of different orders of streaming, a probability that said blocks of data will arrive at said destination node on time; and
selecting, for each of said network performance models, an order of streaming for which said probability that said blocks of data will arrive late at said destination node on time is minimized; and
specifying an order for streaming said blocks of data using said probability.

30. The non-transitory computer-usable storage medium of claim 29 wherein said blocks of data comprise frames of video data that are predictively encoded.

31. The non-transitory computer-usable storage medium of claim 29 wherein said blocks of data are associated with an initial streaming order, wherein a different order of streaming is achieved by moving, relative to said initial streaming order, a block of data forward a first number of positions and a second number of blocks of data backward at least one position each, wherein said first number and said second number are equal.

32. A system for streaming media data in a network, said system comprising:
an input device for receiving media data comprising blocks of data, wherein said blocks of data are received in a first order; and
an output device for streaming said blocks of data in an order that is selected according to performance characteristics of a path used for said streaming, wherein said blocks of data are reordered in a second order different from said first order, said second order corresponding to said order that is selected according to said performance characteristics, wherein said performance characteristics comprise delays associated with said path, wherein said delays comprise at least one of a propagation delay associated with data traveling over links in said path, a queue delay associated with nodes encountered on said path, and a retransmission delay associated with retransmitting lost data.

33. The system of claim 32 wherein said performance characteristics comprise data packet losses.

34. The system of claim 32 wherein said blocks of data are characterized according to their relative importance, wherein said order is also selected according to said relative importance.

35. The system of claim 32 wherein said blocks of data comprise frames of video data that are predictively encoded.

36. The system of claim 32 wherein a block of data is sent ahead of time relative to when it would have been sent according to an initial intended order of streaming, wherein said block of data moves ahead a first number of positions relative to its position in said initial intended order.

37. A system for streaming blocks of data over a network, said system comprising:
an input element for receiving said blocks of data in a first order;
a controller element for selecting an order for streaming said blocks of data, said order determined according to performance characteristics of a path used for said streaming, wherein said controller element reorders said blocks of data in a second order different from said first order, said second order corresponding to said order determined according to said performance characteristics, wherein said performance characteristics comprise delays associated with said path, wherein said delays comprise at least one of a propagation delay associated with data traveling over links in said path, a queue delay associated with nodes encountered on said path, and a retransmission delay associated with retransmitting lost data; and
an output element for streaming said blocks of data according to said second order.

38. The system of claim 37 wherein said blocks of data constitute media data that are predictively encoded.

39. The system of claim 37 wherein said order for streaming said blocks of data is specified according to a prediction of whether said blocks of data will arrive at a destination node on time.

40. The system of claim 37 wherein said order for streaming said blocks of data is selected from a lookup table.

* * * * *